(12) United States Patent
Facchinello et al.

(10) Patent No.: US 11,745,571 B2
(45) Date of Patent: *Sep. 5, 2023

(54) TONNEAU COVER LATCH SYSTEM

(71) Applicant: Tectum Holdings, Inc., Ann Arbor, MI (US)

(72) Inventors: Jerome Facchinello, Grand Blanc, MI (US); Chad A. Carter, Manchester, MI (US); Robert L. Mosingo, Saline, MI (US)

(73) Assignee: Extang Corporation, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,200

(22) Filed: Aug. 22, 2022

(65) Prior Publication Data

US 2022/0396132 A1 Dec. 15, 2022

Related U.S. Application Data

(63) Continuation of application No. 17/320,559, filed on May 14, 2021, now Pat. No. 11,453,277, which is a continuation of application No. 16/428,265, filed on May 31, 2019, now Pat. No. 11,040,606.

(51) Int. Cl.
*B60J 7/19* (2006.01)
*B60J 7/14* (2006.01)

(52) U.S. Cl.
CPC .............. *B60J 7/198* (2013.01); *B60J 7/141* (2013.01)

(58) Field of Classification Search
CPC . B60J 7/141; B60J 7/198; E05B 83/16; E05B 85/10; E05C 9/043

USPC ........................ 296/100.07, 100.09
See application file for complete search history.

(56) References Cited

U.S. PATENT DOCUMENTS

| | | | |
|---|---|---|---|
| 4,210,361 A | 7/1980 | Marvin et al. | |
| 5,350,213 A | 9/1994 | Bernardo | |
| 5,755,467 A | 5/1998 | Dilluvio et al. | |
| 6,006,560 A | 12/1999 | DeVries | |
| 6,497,445 B1 | 12/2002 | Combs, II | |
| 6,685,240 B2 | 2/2004 | Bacon | |
| 7,052,071 B2* | 5/2006 | Mulder | E05B 83/26 296/100.1 |
| 7,261,328 B2 | 8/2007 | Minix | |
| 7,278,674 B1 | 10/2007 | Bogard | |
| 7,363,786 B2* | 4/2008 | TerHaar | E05B 83/16 292/216 |
| 9,827,839 B2 | 11/2017 | Williamson et al. | |
| 10,286,765 B2* | 5/2019 | Williamson | B60P 7/00 |
| 10,500,934 B1 | 12/2019 | Weng et al. | |
| 11,351,846 B2* | 6/2022 | Schollhammer | B60J 7/198 |
| 2002/0180220 A1 | 12/2002 | Bacon | |
| 2005/0029832 A1 | 2/2005 | Verduci et al. | |
| 2005/0146158 A1 | 7/2005 | Schmeichel et al. | |
| 2005/0284199 A1* | 12/2005 | Gulley | E05B 13/004 70/208 |
| 2017/0259654 A1 | 9/2017 | McDonald, II et al. | |

(Continued)

*Primary Examiner* — Jason S Morrow
(74) *Attorney, Agent, or Firm* — The Dobrusin Law Firm, P.C.

(57) ABSTRACT

A latch system for a tonneau cover. The latch system includes a handle that is configured to move about an axis; and a latch pin connected to the handle. The latch pin is configured to move in a retracted direction and during movement of the handle towards the tonneau cover.

19 Claims, 6 Drawing Sheets

(56) References Cited

U.S. PATENT DOCUMENTS

| | | |
|---|---|---|
| 2018/0147925 A1 | 5/2018 | Williamson et al. |
| 2018/0345768 A1* | 12/2018 | Frederick ................. B60J 7/198 |
| 2020/0331329 A1* | 10/2020 | Schmeichel ............. B60J 7/198 |
| 2020/0346533 A1 | 11/2020 | Dylewski, II et al. |
| 2020/0376944 A1 | 12/2020 | Facchinello et al. |
| 2021/0229538 A1* | 7/2021 | Becker .................... E05C 1/006 |
| 2022/0176786 A1* | 6/2022 | Dylewski, II ............ B60J 7/141 |

* cited by examiner

TONNEAU COVER LATCH SYSTEM

FIELD

These teachings relate to a tonneau cover, and more particularly to a latch system for opening and closing a tonneau cover.

BACKGROUND

Some vehicles, like pick-up trucks, have an open-topped bed or cargo area that may be used for storing or transporting cargo. A cover, such as a tonneau cover, may be placed over the cargo area. The cover may be opened to access the cargo and/or the inside of the cargo area and closed to conceal the cargo from view and/or to prevent fluid and/or debris from entering the cargo area.

Some covers have a latch system for opening and closing the cover. However, many latch systems are not intuitive to operate. For example, to open some covers, some latch systems require an operator to pull down on the latch with one hand while pushing up on the cover with the other hand. These simultaneous, opposing movements may be awkward for an operator, especially for an operator who is unfamiliar with the cover and/or latch system and/or for an operator who does not have two free hands to operate the cover and/or latch system.

Accordingly, it may be desirable to have an improved cover and/or latch system that that overcomes at least some of the aforementioned challenges.

SUMMARY

These teachings are directed to a tonneau cover and a latch system. The latch system may be used to open and/or close the tonneau cover. Movement of the latch system in a direction of the tonneau cover is configured to open the tonneau cover. Movement of the latch system in an upward direction is configured allow the tonneau cover to move or open in the same general upward direction.

A latch system for a tonneau cover, the latch system comprising a handle that is configured to move about an axis; and a latch pin connected to the handle. The latch pin is configured to move in a retracted direction during movement of the handle towards the tonneau cover.

A latch system for a tonneau cover, the tonneau cover having at least one panel, the latch system comprising: a handle; a latch pin; and a mechanism that is configured to convert rotation of the handle into movement of the latch pin. Rotation of the handle towards the panel of the tonneau cover causes the latch pin to move.

A latch system for a tonneau cover, the tonneau cover having at least one panel, the latch system comprising: a handle; a latch pin; and a mechanism that is configured to convert rotation of the handle into movement of the latch pin, the mechanism includes a bell crank. Rotation of the handle about an axis towards the panel of the tonneau cover causes the bell crank to rotate about a second axis, which causes the latch pin to move.

DETAILED DESCRIPTION

Figure 1:
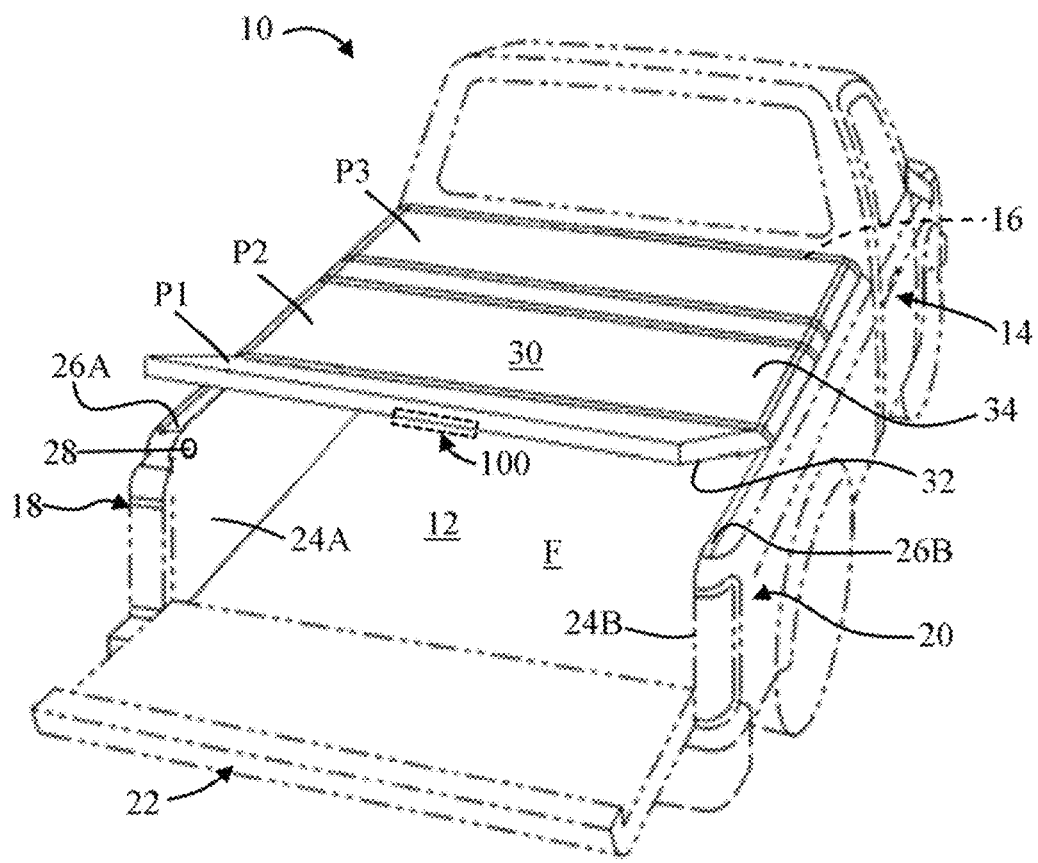
FIG. 1 is a perspective view of a vehicle and a tonneau cover.

The vehicle may be any vehicle that has a cargo area. The cargo area may be any area or portion of the vehicle used for storing or transporting goods or cargo. The cargo area may be a cargo box, a bed, a trunk, or a combination thereof. The cargo area may be any part of the vehicle that has an open top that can be at least partially closed or covered by a cover, which may be a trunk, decklid, tonneau cover, cap, tent, tarp, board, or a combination thereof. The cargo area may also be a trailer that is configured to be pulled or pushed by the vehicle.

The cargo area may be defined by one or more walls, which may also be referred to as bed walls or fenders and a tailgate.

The cover may be any cover that is located on top of a cargo area. The cover may be a tonneau cover. The tonneau cover may function to protect against dirt, debris, fluid, and/or other contaminants from entering an inside of a cargo area. The tonneau cover may function to conceal the inside of the cargo area and/or contents inside the cargo area. The cover may also be a trunk, decklid, cap, tent, tarp, board, or a combination thereof. The cover may also be a truck cap or tent that functions to increase a height of a cargo area.

The tonneau cover may comprise one or a plurality of panels. The one or more of the panels can be moved or repositioned relative to one another and/or relative to the cargo area to move the tonneau cover between an open configuration and a closed configuration. The open configuration is where one or all of the panels are moved to provide access to the cargo box. The closed configuration is where one or all of the panels at least partially cover the cargo box.

The one or more panels may be configured to be rolled-up into a closed configuration and unrolled into the open configuration. The one or more panels may be configured to be folded-up into a closed configuration and then unfolded into the open configuration. In some configurations, the tonneau cover may be a single panel cover. The single panel can be raised or pivoted relative to the walls or top surfaces of the cargo area and/or tailgate to move the tonneau cover from the closed configuration to the open configuration, and then lowered or pivoted downwards to the closed configuration.

One or more of the panels may be substantially rigid. One or more of the panels may be substantially flexible, but stabilized with a rigid frame. The tonneau cover may be a canvas, fabric, a folded, or roll-up type tonneau cover.

These teachings provide a latch system. The latch system may be used lock and unlock the tonneau cover, open and close the tonneau cover, or a combination thereof. The latch system includes one or more features or elements that cooperate with the tonneau cover and one or more walls defining the cargo area to lock, unlock, open, and/or close the tonneau.

The latch system may be located on or attached to a bottom side or inside surface of the tonneau cover or one or more panels thereof. The latch system may be located at any portion of the tonneau cover, as long as the latch can be accessed by a user standing outside of the cargo area of the vehicle. The latch system may be located or attached to a rear-most panel, located closest to the tailgate.

The latch system or one or more elements of the latch system may be located inside one or more panels of the tonneau cover. For example, the latch system or one or more elements thereof, like the mechanism, may be located between a top or outside surface of the tonneau cover or panel and a bottom or inside of surface of the tonneau cover.

The latch system may be generally centered along a center longitudinal axis of the vehicle and/or cargo area, or the latch system may be offset towards either the driver or passenger side of the vehicle.

In some configurations, the latch system may be located or attached to the tailgate one or both of the walls of the cargo area, or a combination thereof and may function to engage and disengage the tonneau cover to lock and unlock the tonneau cover.

The latch system may include one or more handles. The handle may be moved or manipulated to actuate the latch system, the mechanism, one or more of the latch pins, or a combination thereof. The handle may be moved manually by applying a force onto the handle with one or both hands of a user. The handle may be moved automatically via a motor, battery, cylinder, spring, biasing member, piston, or combination thereof.

Moving or movement of the handle as used herein means moving, tipping, rotating, biasing, pressing, pushing, pulling, repositioning, or otherwise changing a position or location of the handle relative to the mechanism, latch pins, tonneau cover or panel(s), floor of the cargo area, or a combination thereof.

The handle may be moved, pivoted, or tipped about an axis. The handle may be moved upwardly or in a direction towards a bottom or inner surface of the tonneau cover or panel to unlock or open the tonneau cover. The handle may be moved upwardly or in a direction away from a bottom or floor or inner surface of the cargo bed to unlock or open the tonneau cover. The handle may be moved downwardly or in a direction away from a bottom or inner surface of the tonneau cover or panel to lock or close the tonneau cover.

The handle may be incorporated into or made integral with the bottom surface or portion of the panel of the tonneau cover. That is, as a user lifts or depresses or deforms a bottom or inside surface of the rear-most panel of the tonneau cover, the mechanism, and/or cam follower and/or bell crank may move, which causes the rest of the mechanism to move the latch pins out of engagement with the latch engagement features to allow the tonneau cover to open.

The cover may function to house, conceal, and/or contain one or more elements of the latch system and/or mechanism. The cover may be incorporated into the bottom surface or portion of the panel of the tonneau cover. The cover may be a member that is attached to the bottom surface or portion of the panel of the tonneau cover.

The latch system comprises one or more latch pins. The latch system may include one or more latch pins extending from a driver side, from a passenger side, or both. The one or more latch pins may engage a latch engagement feature in the cargo area to close or lock the tonneau cover. The one or more latch pins may disengage a latch engagement feature in the cargo area to open or unlock the tonneau cover.

The latch pins may be an elongated member having a round oval, square, hexagon, or polygon cross-section that is configured to move upon manipulation of the handle, latch system, or mechanism.

The latch pins may be spring loaded or otherwise biased for moving the latch pins back into a steady state position after the handle has been manipulated. The steady state position of the latch pin may be an extended position or retracted position.

The latch engagement feature may be one or more openings, bores, slots, channels, pockets, depressions, catches, or other features defined or formed in one or both of the walls defining the cargo area that are configured to engage the latch pins to lock or close the tonneau cover. The latch engagement feature may be located in the tailgate or floor of the cargo area. The latch engagement feature may be features that are present in the cargo area (i.e., formed by the OEM) or the latch engagement features may be added as an aftermarket modification.

The latch system comprises a mechanism that is configured to translate movement of the handle into movement of one or more latch pins. The mechanism may include one or more gears, belts, links, bell cranks, axles, springs, or a combination thereof. The mechanism may include a motor, battery, rotary to linear actuator (actuators that translate rotatory motion into linear motion), or a combination thereof.

The mechanism may include one or more links. A link may be a member through which a force is transmitted to move the latch pins. The force may be a result of movement of the handle, bell crank, latch pins, biasing members, or a combination thereof. One or more of the links may move or pivot or rotate upon movement of the bell crank or axles or biasing member. One or more links may move or pivot or be pulled upon movement of a cam follower and/or spring.

Figure 3:
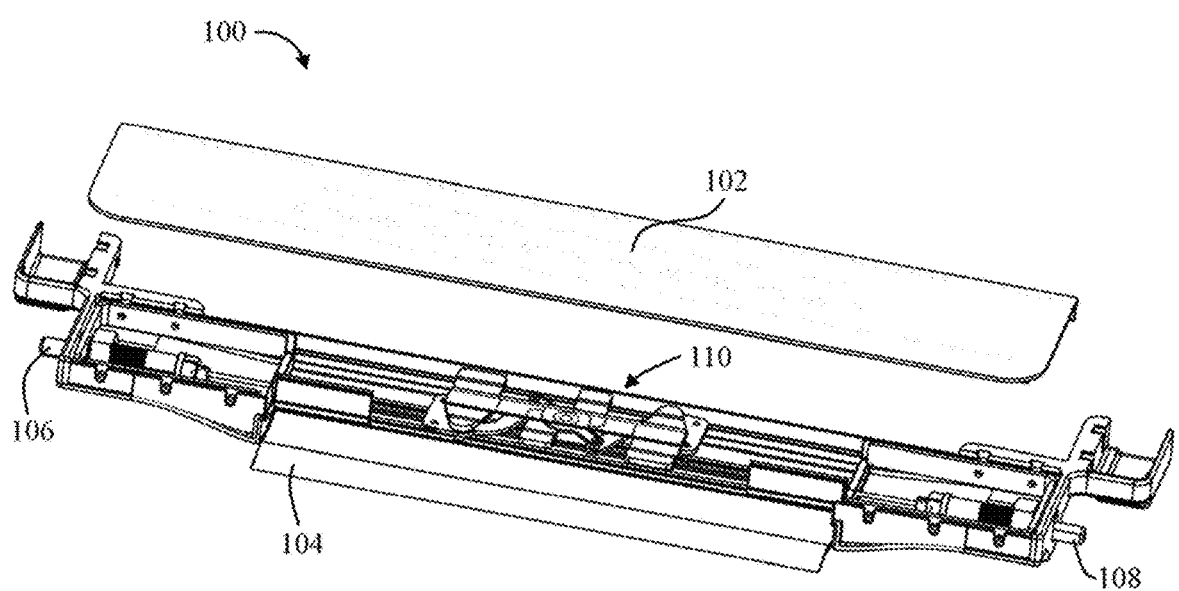
FIG. 3 is a partially-exploded view of the latch system.
Figure 4:
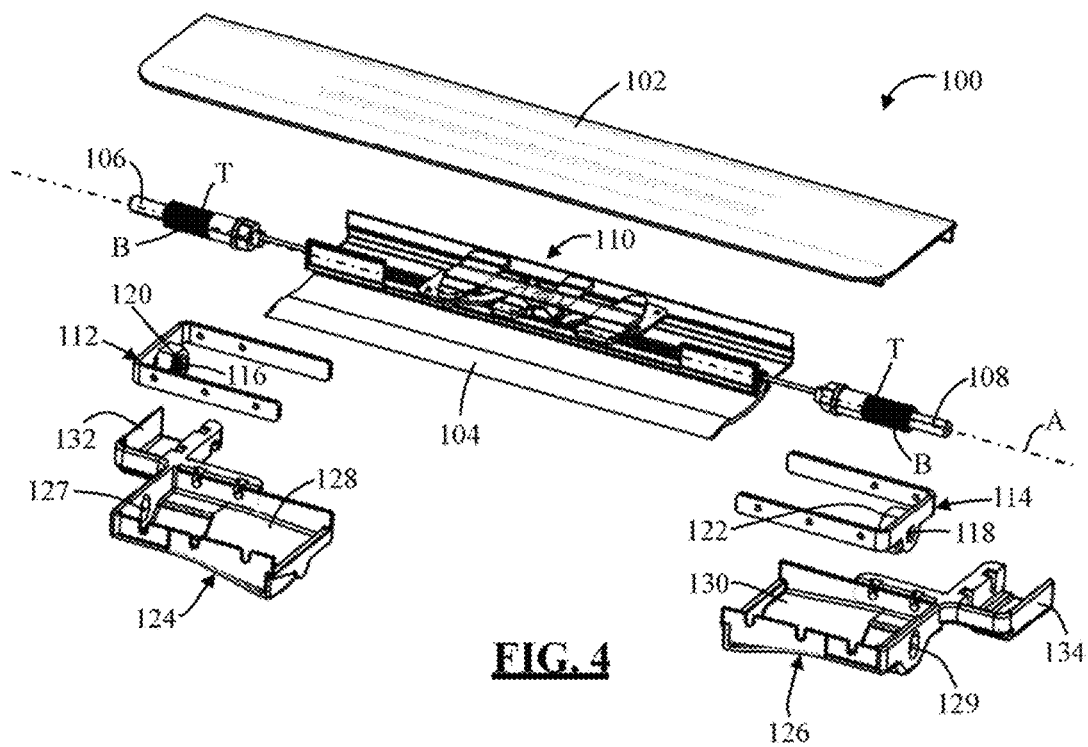
FIG. 4 is a partially-exploded view of the latch system.
Figure 5:
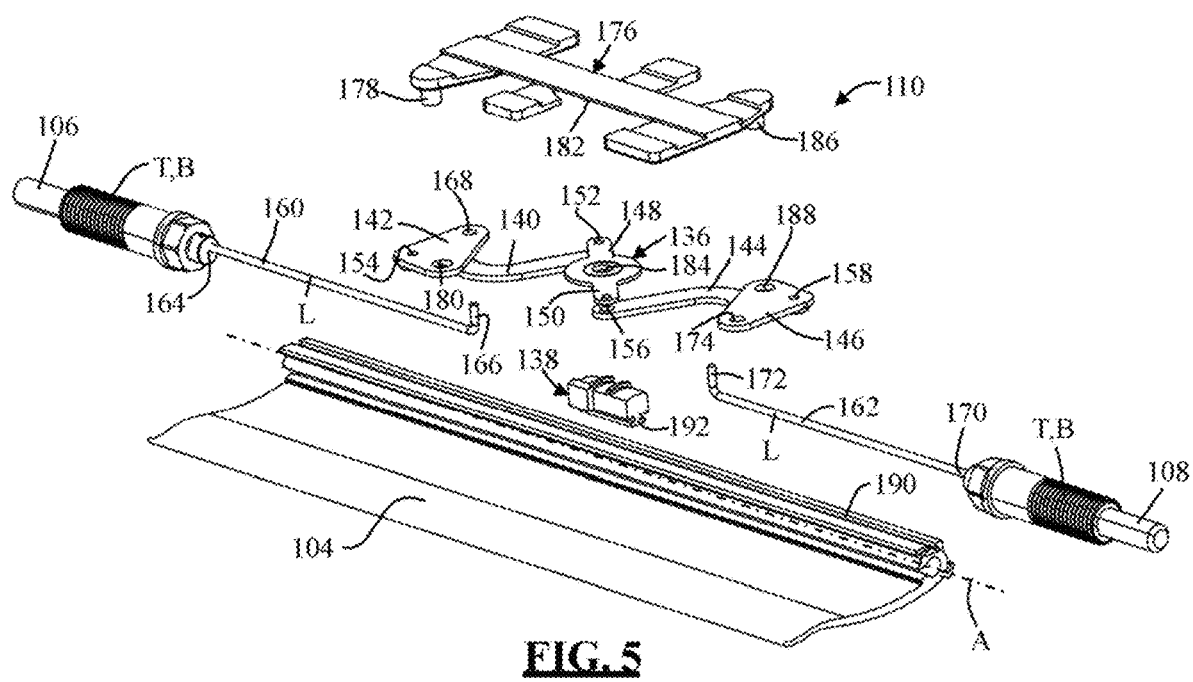
FIG. 5 is a partially-exploded view of the latch system.
Figure 9A:
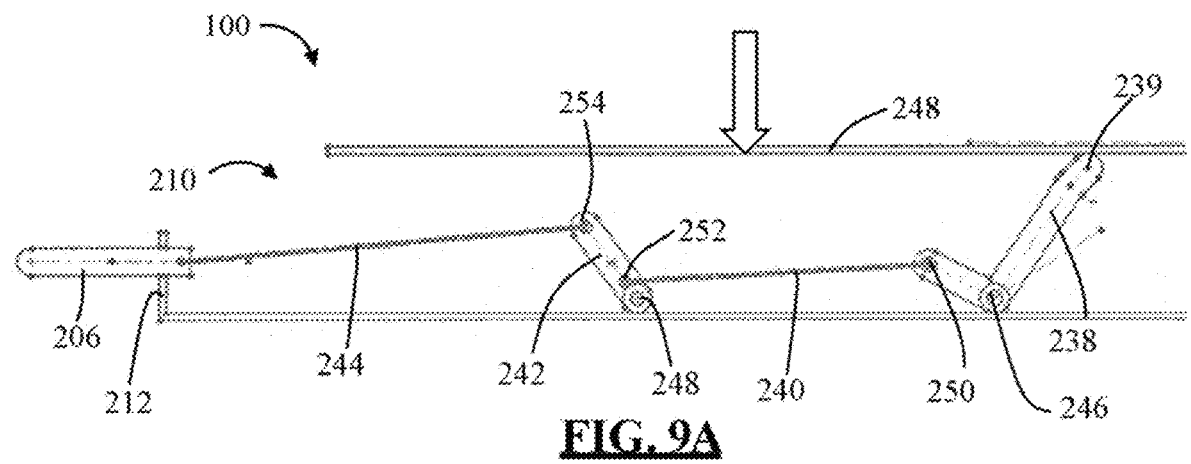
FIG. 9A is a cross-sectional view of a latch mechanism.
Figure 9B:
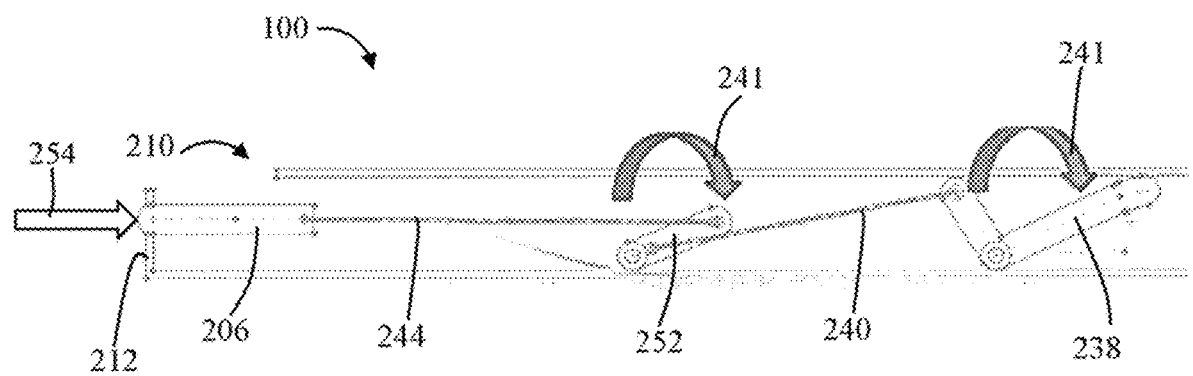
FIG. 9B is a cross-sectional view of a latch mechanism.

While the mechanism illustrated in the FIGS. 3-5 shows a total of four links (i.e., two links per side), it is understood that the mechanism may include more than two links per side, or less than two links per side. Also, in some configurations, one or both of the axles may be connected directly to the ball crank, for example, the end pieces of each axle may directly engage the arms of the bell crank and/or directly to the latch pins. In some configurations, the axles may be the latch pins. In some configurations, the latch pins may be connected directly to the bell crank. In some configurations, one or both of the links may be incorporated into or with one or axles or arms of the bell crank and/or axles. Also, while the mechanism in FIGS. 9A-9B shows three links, more than three or less than three links may be used.

A link may be a rigid member. A link may have an elongated linear or curved shape. A link may have a triangular, square, or other shape. A link may be a cable. The cable may be a single wire or may be a multiple wires braided together.

One or more of the bell crank, links, axles, and brackets may be connected via one or more connections. A connection may include a pin engaging two bores or opening in adjacent members to be connected. A connection may be a protrusion, screw, pin, or rivet in one element engaging a hole, nut, or bore in another element.

The mechanism may include one or more axles. An axle may be a member through which a force is transmitted to move the latch pins. The force may be a result of movement of the handle, bell crank, latch pins, biasing members, links, or a combination thereof.

The axles may be generally rigid members that are straight or linear; however, in some configurations the axles may be curved or non-linear.

The axles may be moved along a linear path between the extended and retracted positions. However, in some configurations, one or both of the axles may move along a curved or angled path between the extended and retracted positions.

In some configurations, one or both of the axles may be incorporated one or more of the links or arms of the bell crank and/or latch pins.

The mechanism may include one or more biasing members. A biasing member may function to move the mechanism or one or more elements thereof like: latch pins, handle, or a combination thereof into a steady state position. The steady state position may be a position where the latch pin engages, or disengages the latch engagement feature.

The biasing member may be located anywhere on the mechanism where the biasing member may perform the aforementioned function. The biasing member may be located or sandwiched between the latch pin and abutment or bracket.

The bell crank may function to distribute a pivoting or rotational force or movement into one or more directions.

The bell crank may include one or more arms. For example, the bell crank may include one arm operatively connected to an axle, latch pin, or link. The bell crank may include two or more arms, each one of which may be connected to one or more axles, latch pins, links, etc.

The bell crank may be rotated by way of movement of the handle, cam follower, or both. The bell crank may rotate about an axis that is different than an angle about which the handle or cam follower is rotated, moved, or pivoted. The bell crank may rotate or pivot about an axis that is generally perpendicular to the axles about which the handle or cam follower is moved, rotated or pivoted.

The latch system may include one or more cam followers. A cam follower may function to transfer movement of the handle into movement of the bell crank. The cam follower may include a suitable feature for engaging the handle. The cam follower may be made as an integral component of the handle or may be attached or engaged with a suitable feature in the handle at a connection. The connection may be a press fit connection (i.e., the cam follower press fit into a feature in the handle); or the connection may include one or more fasteners like pins, screws, rivets, and the like.

The cam follower may engage the bell crank via a connection. The connection may be via a pin or protrusion engaging a slot or channel.

The latch system may include one or more brackets. A bracket may function to support movement of the mechanism, one or more links or axles, the latch pin, or a combination thereof. the bracket may function to add strength or rigidity to the mechanism. The bracket may be attached to the tonneau cover or panel thereof.

A bracket may engage one or more of the links and bell crank. The bracket may function to maintain the links and bell crank in an operative connection. The bracket may function to provide a connection about which one or more of the links and bell crank pivot or rotate about during movement of the handle and/or mechanism.

FIG. 1 illustrates a vehicle 10. The vehicle 10 includes a cargo area 12 and a passenger area or cab 14.

The cargo area 12 is defined by one or more walls that include: a front wall 16 that is located adjacent the passenger area or cab 14; opposing side walls 18, 20; and a tailgate 22 that opposes the front wall 16. Each side wall 18, 20 has an inner wall 24A, 24B that faces an inside of the cargo area 12 and a top surface 26A, 26B. One or both of the inner walls 24A, 24B include a latch engagement feature 28, discussed further below.

The inside of the cargo area 12 has a bottom or floor F surrounded by the walls 16, 18, 20, 22. The cargo area 12 has an open top that is opposite the floor F that can be covered with a cover 30, like a tonneau cover 30. The tonneau cover 30 may be attached to or supported on one or more rails or frames connected to the inner walls 24A, 24B; and/or attached to or supported on the top surfaces 26A, 26B of the side walls 18, 20. Additionally, or alternately, the tonneau cover 30 may be attached, connected, or supported on one or both inner or top surfaces of the front wall 16 and/or tailgate 22.

The tonneau cover 30 includes one or more panels. In FIG. 1, the tonneau cover 30 includes panels P1, P2, P3 that can be moved or repositioned relative to one another and/or the cargo area 12 to move the tonneau cover 30 between and open and closed configuration. The panel P1 may be referred to as the rear-most panel. The tonneau cover 30 and/or panels include an inner surface 32 that faces the floor F of the cargo area 12.

A latch system 100 is illustrated schematically in FIG. 1. The latch system 100 is configured to be manipulated to open and close the tonneau cover 30 and/or lock and unlock the tonneau cover 30. In FIG. 1, the latch system 100 is attached with the rear-most panel P1; however, the latch system 100 may be attached with one or more of the panels P1-P3.

Figure 2:
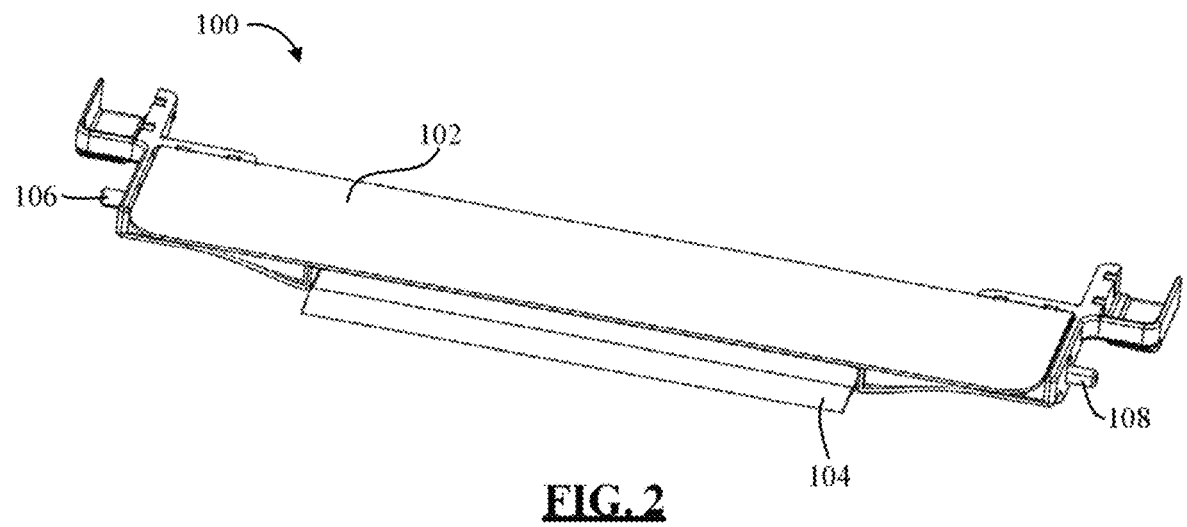
FIG. 2 is a perspective view of a latch system.

FIGS. 2 and 3 illustrate the latch system 100. The latch system 100 comprises a cover 102, a handle 104, and latch pins 106, 108. In the orientation illustrated, latch pin 106 may be located on the driver's side of the vehicle, and latch pin 108 is located on the passenger side of the vehicle. In some configurations, one of the latch pins 106, 108 may be omitted. In other configurations, the driver side may include more than one latch pin 106 and/or the passenger side may include more than one latch pin 108.

The cover 102 may be one of the panels P of the tonneau cover 30, for example the rear-most panel P1 that is located adjacent the tailgate 22 (FIG. 1). In other configurations, the cover 102 may be a discrete member that is attached to the bottom surface 32 of a panel P of the tonneau cover 30, for example the rear-most panel P1. The cover 102 may function to at least partially cover or conceal a mechanism 110 that is configured to convert movement of the handle 104 into movement of one or both of the latch pins 106, 108 into or between an extended direction and in a retracted direction, as will be discussed further below.

Referring to FIG. 4, the latch system 100 comprises a first bracket 112 and a second bracket 114. Each bracket 112, 114 comprises an opening 116, 118 through which at least a portion of the corresponding latch pin 106, 108 is configured to extend (See FIGS. 2, 3, for example). Each bracket 112, 114 comprises an abutment 120, 122 against which or into which a portion of the latch pin 106, 108 may engage. For example, the latch pin 106, 108 may include a threaded section T that engages a corresponding threaded section in the abutment 120, 122. The latch pins 106, 108 may slide relative to the brackets 112, 114 between the extended and retracted positions. The latch system 100 comprises a biasing member B located at or between each latch pin 106, 108 and abutment 120, 122 or bracket 112, 114 engagement.

The latch system 100 comprises a pair of covers 124, 126. Each cover 124, 126 comprises a first portion 128, 130 and a second portion 132, 134. Each cover 122, 124 is configured to support a respective bracket 112, 114 in the corresponding first portion 124, 126. Each of the first portions 124, 126 include an opening 127, 129 for the corresponding latch pin 106, 108 to at least partially extend through (See FIGS. 2, 3). Each cover 124, 126 is secured to the inside wall 24A, 24B of the side wall 18, 20 and/or the bottom surface 32 of one of the panels P of the tonneau cover 30, for example, the rear most panel P1.

The handle 104 is configured to be moved, tipped, pivoted, rotated, displaced, repositioned, or a combination thereof relative to the cover 102 or a panel P of the tonneau cover 30 to move the latch pins 106, 108 into or between an extended direction and in a retracted direction. The handle 104 is configured to be moved, tipped, pivoted, rotated, displaced, repositioned, or a combination thereof relative to the cover 102 or a panel P of the tonneau cover 30 manually by an operator, or automatically via a mechanism such as a motor, a piston and cylinder system, or the like.

The handle 104 can be moved, tipped, pivoted, rotated, displaced, repositioned, or a combination thereof about axis A in a direction towards the cover 102 or a panel P of the tonneau cover 30 and/or in a direction away from the bottom surface or floor F of the cargo area 12 (FIG. 1) to move the latch pins 106, 108 in a retracted direction. The retracted direction means that one or both of the latch pins 106, 108 move out of, or in a direction away from, or disengage the latch engagement feature 28 and/or the inner wall 24A, 24B of the side walls 18, 20 to unlock or open the tonneau cover 30. The retracted direction means that one or both of the latch pins 106, 108 move towards each other and/or towards a center line of the vehicle 10.

The handle 104 can be moved, tipped, pivoted, rotated, displaced, repositioned, or a combination thereof about axis A in a direction away from the cover 102 or a panel P of the tonneau cover 30 and/or in a direction towards the bottom surface or floor F of the cargo area 12 (FIG. 1) to move the latch pins 106, 108 in an extended direction. The extended direction means that one or both of the latch pins 106, 108 move into, or in a direction towards, or engage the latch engagement feature 28 and/or the inner wall 24A, 24B of the side walls 18, 20 to lock or close the tonneau cover 30. The extended direction means that one or both of the latch pins 106, 108 move away from each other and/or away from a center line of the vehicle 10. The latch pins 106, 108 may also be moved in the extended direction via the one or more biasing members. After the handle 104 is released by the operator and/or is no longer being moved, tipped, pivoted, rotated, displaced, repositioned, or a combination thereof about axis A in a direction towards the bottom surface of the cover 102 or a panel P of the tonneau cover 30 and/or in a direction away from the bottom surface or floor F of the cargo area 12 (FIG. 1).

FIG. 5 illustrates the mechanism 110. The mechanism 110 comprises a bell crank 136, a cam follower 138, and links 140, 142, 144, 146.

The bell crank 134 comprises a first arm 148 and a second arm 150. The first arm 148 is connected to the first link 140 at a first connection 152, and the first link 140 is connected to the second link 142 at a second connection 154. The second arm 150 of the bell crank 136 is connected to the third link 144 at a third connection 156, and the third link 144 is connected to the fourth link 146 at a fourth connection 158.

The latch system 100 and/or mechanism 110 comprises a first axle 160 and a second axle 162. At one end 164, the first axle 160 is connected to the first latch pin 106, and at another end 166 the first axle 160 is connected to the second link 142 at a fifth connection 168. At one end 170, the second axle 162 is connected to the second latch pin 108, and at another end 172 the second axle 162 is connected to the fourth link 146 at a sixth connection 174.

The latch system 100 and/or mechanism 110 comprises a bracket 176 that is configured to engage one or more of the links 140, 142, 144, 146, the bell crank 136, or any combination thereof. The bracket 176 comprises a first protrusion 178 that engages the second link 142 at a connection 180; a second protrusion 182 that engages the bell crank 136 at a connection 184; and a third protrusion 186 that engages the fourth link 146 at a connection 188.

The handle 104 comprises a channel 190 that extends at least partially along a length of the handle 104. The channel 190 may be generally offset and/or parallel to the axis A about which the handle 104 moves or rotates. The channel 190 is configured to engage the first axle 160, the second axle 162, and the cam follower 138.

A linear portion L of each of the axles 160, 162 is received in the channel 190. The axles 160, 162 are contained in or engage the channel 190 such that the axles 160 are moveable or free to move or slide within the channel 190 along the axis A towards each other (i.e., in the retracted direction) and away from each other (i.e., in the extended direction).

The cam follower 138 comprises an engagement portion 192 that is contained in or engages the channel 190. The engagement portion 192 is configured to engage the channel 190 such that movement of the handle 104 causes the cam follower 138 to move. More specifically, movement, rotation, pivoting, of the handle 104 about axis A causes the cam follower 138 to also move, rotate, or pivot with the handle. The engagement portion 192 may have a suitable shape or geometry for engaging the channel 190, such as a T-shaped cross section, for example.

Figure 6:
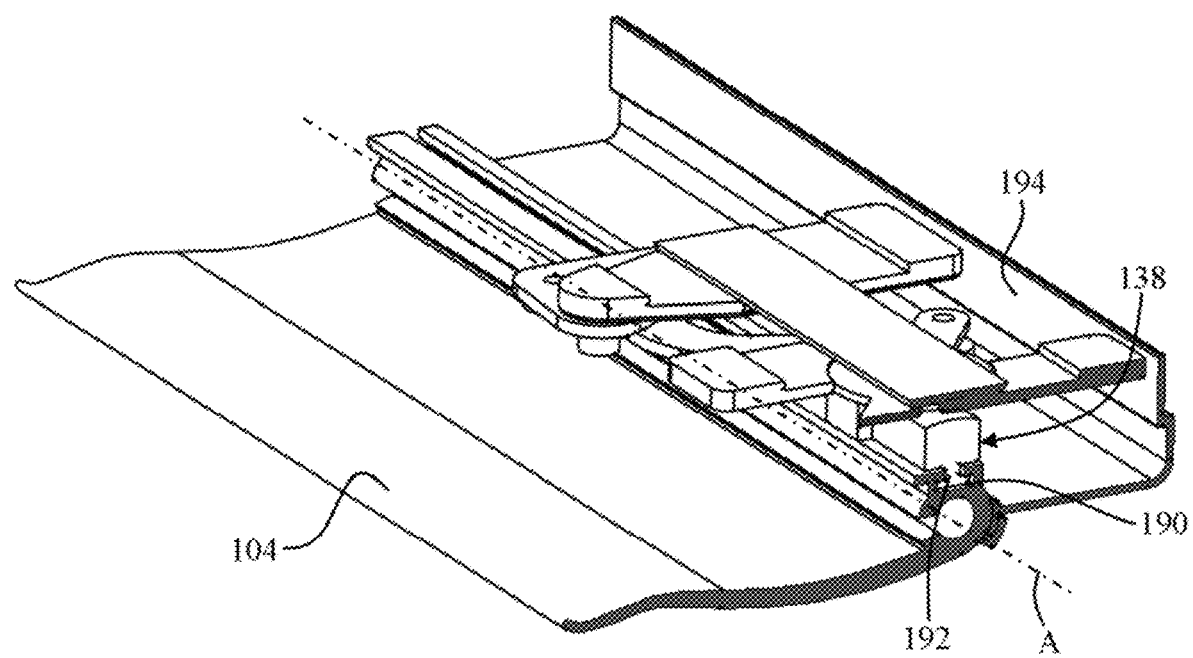
FIG. 6 is a section view of the latch system.

FIG. 6 illustrates the T-shaped engagement portion 192 of the cam follower 138 engaging the channel 190 of the handle 104. The latch system 100 comprises a back cover 194 configured to cover or protect the mechanism 110.

Figure 7:
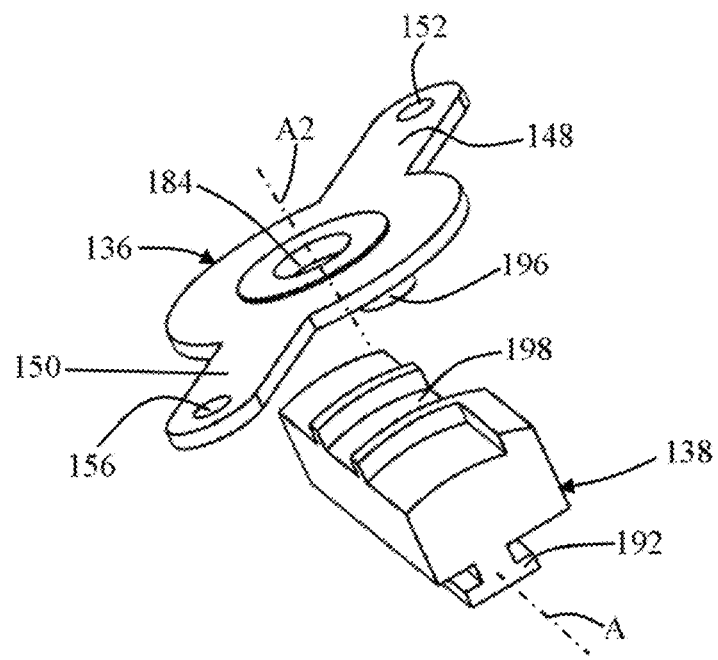
FIG. 7 is perspective view of a bell crank and cam follower of the latch system.

FIG. 7 illustrates the bell crank 136, the first and second arms 148, 150 of the bell crank 136; the connections 152, 156 of the first and second arms 148, 150; and the connection 184 that engages the protrusion 182 of the of the bracket 176 (FIG. 5). The bell crank 136 comprises a connection 196 that engages a connection slot 198 of the cam follower 138. The connection 196 may be a protrusion and the connection slot 198 may be a slot, groove, notch, recess, or channel. During use, movement of the handle 104 causes the cam follower 138 to move, pivot, tip, or rotate about axis A (see also FIGS. 4-6), which then causes the bell crank 136 to rotate about axis A2. Axis A and axis A2 may be generally perpendicular to each other.

Figure 8A:
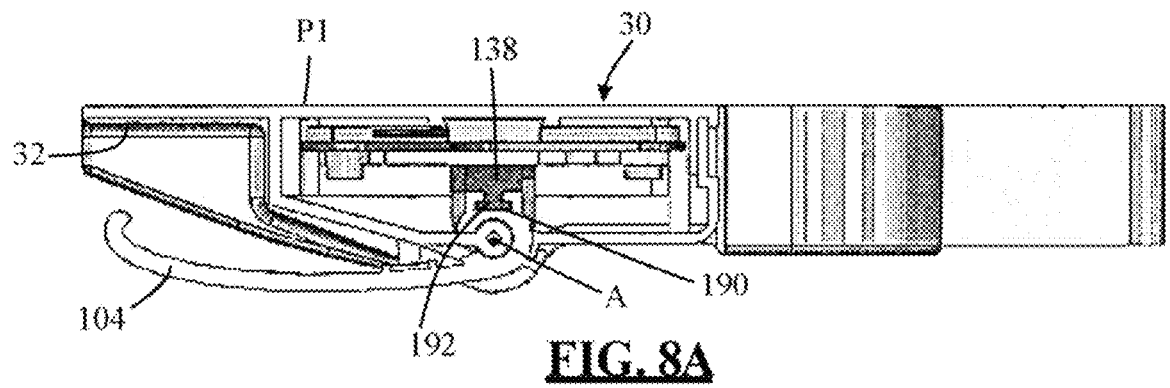
FIG. 8A is a cross-sectional view of the latch mechanism.
Figure 8B:
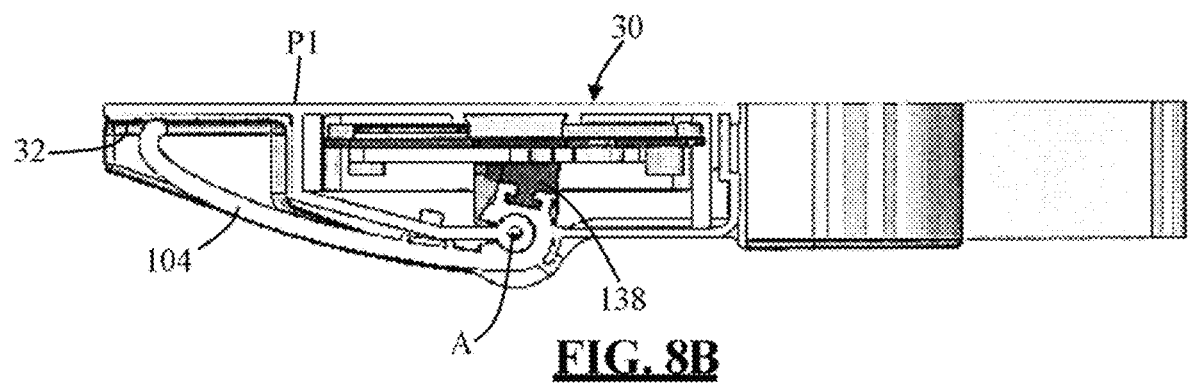
FIG. 8B is a cross-sectional view of the latch mechanism.

FIG. 8A illustrates the handle 104 in the locked position where the latch pins 106, 108 are in the extended position and engage the corresponding latch engagement feature 28, and FIG. 8B illustrates the handle 104 in the unlocked position where the latch pins 106, 108 are in the retracted position and disengage the corresponding latch engagement feature 28.

Movement (i.e., rotating, tipping, displacing, etc.) of the handle 104 from the locked to unlocked position (i.e., from position in FIG. 8A to FIG. 8B) about axis A causes the cam follower 138 to move, rotate, or pivot with the handle 104. And movement of cam follower 138 causes the bell crank 136 to rotate or pivot about its axis A2 (FIG. 7).

Operation of the latch mechanism 100 will now be described with reference to FIGS. 1-8B.

To open, unlatch, or unlock the tonneau cover 30 when the tonneau cover 30 is in the closed or locked or covered position, the tailgate 22 may be moved down or lowered into the open position (i.e., FIG. 1). The handle 104 may be moved, tipped, pivoted, rotated, or a combination thereof in an unlocking direction, which may be in an upwardly direction or in a direction towards the inner surface 32 of the cover 102 or panel P of the tonneau cover 30, or in a direction away from the bottom surface or floor F of the cargo area 12. For example, the handle 104 may be moved from the position illustrate in FIG. 8A to the handle 104 position in FIG. 8B. The handle 104 may be moved, tipped, pivoted, rotated, or a combination thereof manually with one or both hands of an operator, or automatically via a mechanism, motor, piston, cylinder, battery, etc. The handle 104 may be moved, tipped, pivoted, rotated, or a combination thereof in the unlocking direction about axis A.

By way of the engagement of the engagement portion 192 of the cam follower 138 with the channel 190 of the handle 104, movement of the handle 104 in the unlocking direction causes the cam follower 138 to move, tip, pivot, rotate, or a combination thereof in the unlocking direction. See movement or rotation or pivoting of the cam follower 138 from position in FIG. 8A to position in FIG. 8B. By way of the engagement of the connection or protrusion 196 of the bell crank 136 with the connection or channel 198 of the cam follower 138, movement or rotation of the cam follower 138 about axis A in the unlocking direction causes the bell crank 136 to rotate about axis A2 in the unlocking direction, which may be either clockwise or counterclockwise.

By way of the engagement of the arms 148, 150 of the bell crank 136 with the first and third links 140, 144 via the respective connections 152, 156, rotation of the bell crank 136 about axis A2 in the unlocking direction pulls the first and third links 140, 144 towards each other. By way of the engagement of the first and third links 140, 144 and the second and fourth links 142, 146 via the respective connections 154, 158, the second and fourth links 142, 146 are also pulled with the respective the first and third links 140, 144.

By way of the engagement of the axles 160, 162 with the second and fourth links 142, 146 via respective connections 168, 174, pulling of the second and fourth links 142, 146 causes the axles 160, 162 to be pulled in a direction towards each other, which causes the corresponding latch pins 106, 108 to be pulled in a direction towards each other and thus disengage or be removed or pulled out of the corresponding latch engagement features 28 defined in the inner surface 24A, 24B of the side walls 18, 20 (FIG. 1).

After the latch pins 106, 108 disengage are removed or pulled out of the corresponding latch engagement features 28 defined in the inner surface 24A, 24B of the side walls 18, 20, the tonneau cover 30 or panels thereof can be moved, raise, repositioned, or opened.

Movement of the axles 160, 162 and/or latch pins 106 108 towards each other or in the unlocking direction, or out of the latch engagement features 28 causes each of the biasing members B to be compressed between the abutment 120, 122 or bracket 112, 114 and latch pins 106, 108. After the handle 104 is released, the biasing members B may uncompress and move the latch pins 106, 108 and axles 160, 162 in the opposite direction (i.e., away from each other), which thus causes the links 140, 142, 144, 146 to move or rotate in an opposite direction, which causes the bell crank 136 to move or rotate about axis A2 in the opposite direction, which causes the cam follower 138 to move tip or pivot about axis A in the opposite direction, which causes the handle 104 to move, tip, pivot or rotate in an unlocking direction, or in a downwardly direction or away from the inner surface 32 of the cover 102 or panel P of the tonneau cover 30, or in a direction towards from the bottom surface or floor F of the cargo area 12 (i.e., handle 104 movement from position in FIG. 8B to position in FIG. 8A).

FIGS. 9A and 9B illustrate another mechanism 210 for the latch system 100. The mechanism 210 functions much like the mechanism 110 discussed above and many features and elements of the mechanism 110 apply to the mechanism 210 and are incorporated by reference; thus, in the interest of brevity many like features will not be discussed again.

In FIGS. 9A and 9B only one side of the latch system 100 and mechanism 210 is shown, which may be the driver side. The latch system 100 and mechanism 210 may also include a passenger side system, which may be a mirror image of what is illustrated in FIGS. 9A, 9B, or the latch system may only include this driver side (or just a passenger side).

The mechanism 210 comprises a cam follower 238 and links 240, 242, and 244, that are configured to move upon vertical or pivoting or rotation or movement of the handle 104 (FIGS. 1-8B) upwardly towards the bottom surface 32 of the tonneau cover 30 and/or panel P1. Upon movement of the handle 104, a bar 248 is configured to pivot up on an arc or travel vertically towards the tonneau cover 30 and/or panel P1 and contact a contact portion 239 of the cam follower 238 and rotate the cam follower 238 in an unlocking direction 241 (FIG. 9B) about pivot 246, which in this case is a clockwise direction.

By way of the connection 250 between the cam follower 238 and link 240 and the connection 252 between the link 240 and the link 242, rotation of the cam follower 238 in the unlocking direction 241 causes the link 242 to pivot in the unlocking direction 241 about pivot 248.

By way of the connection 254 between the link 242 and the latch pin 206, rotation of the link 242 in the unlocking direction 241 causes the link 242 to pull the link 244 and thus the latch pin 206 in the unlocking direction 254 to disengage the latch engagement feature 28 (FIG. 1) to allow the panel 1 and/or tonneau cover 30 to be opened.

The mechanism 210 may include one or more biasing members between the latch pin 206 and a bracket 212 supporting the latch 206 to move the latch pin 206 from the disengaged position (FIG. 9B) back into the engaged position (FIG. 9A) after the handle 104 is released or the tonneau cover 30 or panel P1 is moved back into the closed position. Additionally or alternatively, the biasing member may be located at one or more of the links 240, 242, 244 and/or the cam follower 238 to move the latch pin 206 from the disengaged position (FIG. 9B) back into the engaged position (FIG. 9A) after the handle 104 is released or the tonneau cover 30 or panel P1 is moved back into the closed position.

Any method steps disclosed herein may be performed in any order. Moreover, one or more of the following method steps can be combined with other steps; can be omitted or eliminated; can be repeated; and/or can separated into individual or additional steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A handle system for a tonneau cover, the handle system comprising:
a handle arranged below at least one panel of the tonneau cover;
a latch operably connected to the handle; and
a cam mechanism operably connected to the handle and the latch, and that converts movement of the handle into movement of the latch;
wherein upon the handle being moved in a direction generally towards the at least one panel of the tonneau cover, the latch is caused to be moved in a retracted direction.

2. The handle system according to claim 1, wherein the cam mechanism comprises a cam follower and a bell crank, wherein the bell crank is caused to be moved upon the cam follower being caused to be moved, which occurs upon the handle being moved.

3. The handle system according to claim 1, wherein the cam mechanism comprises a bell crank that is operably connected to the handle, and that is rotated about an axis upon movement of the handle in the direction generally towards the tonneau cover.

4. The handle system according to claim 1, wherein the cam mechanism comprises a cam follower and the handle comprises a channel that the cam follower engages.

5. The handle system according to claim 4, wherein the cam follower comprises a T-shaped member that engages the channel of the handle.

6. The latch system according to claim 1, wherein the handle comprises a biasing member,
wherein upon the handle being moved in the direction generally towards the at least one panel of the tonneau cover, the biasing member is compressed.

7. The handle system according to claim 1, wherein the cam mechanism comprises at least one configuration selected from a group consisting of: a bar, a cam follower, and one or more links between the cam follower and the latch.

8. The handle system according to claim 1, wherein the cam mechanism comprises at least one configuration selected from a group consisting of: a bell crank, a cam follower, a cam follower having a T-shaped member, a biasing member, a bell crank having a protrusion, and one or more links between the cam follower and the latch.

9. A method of operating the tonneau cover having the handle system according to claim 1, the method comprising:
moving the handle in the direction generally towards the at least one panel of the tonneau cover to cause the latch to move in an unlocking direction to open or unlock the tonneau cover.

10. The method according to claim 9, wherein the method comprises:
moving the handle of the handle system in a direction generally away from the at least one panel of the tonneau cover, to cause the latch to move in a locking direction to close or lock the tonneau cover.

11. The method according to claim 10, wherein the handle system comprises a biasing member, and upon the handle moving in an upwardly direction, the biasing member is compressed.

12. The method according to claim 11, wherein the method comprises: uncompressing the biasing member to cause the latch to move in the locking direction.

13. A method of operating a tonneau cover having a handle system, the method comprising:
moving a handle of the handle system that is arranged below at least one panel of the tonneau cover in an upwardly direction generally towards the at least one panel of the tonneau cover, to cause a latch to move in a retracted direction to open, unlock, or unlatch the tonneau cover, wherein a mechanism is operably connected to the handle and the latch, and that converts movement of the handle into movement of the latch.

14. The method according to claim 13, wherein the handle is located below a rearward-most panel of the tonneau cover in vehicle position.

15. The method according to claim 13, wherein the method comprises:
moving the handle of the handle system in a downwardly direction generally away from the at least one panel of the tonneau cover, to cause the latch to move in an extended direction to close, lock, or latch the tonneau cover.

16. The method according to claim 13, wherein the handle system comprises a biasing member, and upon the handle being moved in the upwardly direction, the biasing member is compressed.

17. The method according to claim 16, wherein the method comprises: uncompressing the biasing member to cause the latch to move in an extended direction.

18. The method according to claim 13, wherein the movement of the latch in the retracted direction includes disengaging or removing the latch from a latch engagement feature defined in or connected to a cargo area of a vehicle.

19. The method according to claim 13, wherein upon moving the handle in the upwardly direction, a cam follower is caused to be moved upwardly towards the at least one panel of the tonneau cover.

\* \* \* \* \*